US010924660B2

(12) United States Patent
Lusk et al.

(10) Patent No.: US 10,924,660 B2
(45) Date of Patent: Feb. 16, 2021

(54) AUGMENTED REALITY MARKERS IN DIGITAL PHOTOGRAPHY

(71) Applicants: Candice D. Lusk, Provo, UT (US); Parker C. Lusk, Provo, UT (US)

(72) Inventors: Candice D. Lusk, Provo, UT (US); Parker C. Lusk, Provo, UT (US)

(*) Notice: Subject to any disclaimer, the term of this patent is extended or adjusted under 35 U.S.C. 154(b) by 0 days.

(21) Appl. No.: 16/368,606

(22) Filed: Mar. 28, 2019

(65) Prior Publication Data
US 2019/0306411 A1    Oct. 3, 2019

Related U.S. Application Data

(60) Provisional application No. 62/649,563, filed on Mar. 28, 2018.

(51) Int. Cl.
*H04N 5/232*     (2006.01)
*G06T 19/00*     (2011.01)
*G06T 7/70*      (2017.01)

(52) U.S. Cl.
CPC .......... *H04N 5/23222* (2013.01); *G06T 7/70* (2017.01); *G06T 19/006* (2013.01); *H04N 5/23218* (2018.08); *H04N 5/232935* (2018.08); *H04N 5/232945* (2018.08); *G06T 2200/04* (2013.01); *G06T 2207/30244* (2013.01)

(58) Field of Classification Search
CPC ......... H04N 5/23222; H04N 5/232935; H04N 5/232945; H04N 5/23218; G06T 19/006; G06T 7/70; G06T 2207/30244; G06T 2200/04; G06T 7/73; G06T 2207/10016; G06T 7/246
See application file for complete search history.

(56) References Cited

U.S. PATENT DOCUMENTS

| | | | | |
|---|---|---|---|---|
| 6,606,117 B1* | 8/2003 | Windle | ............ | H04N 1/00183 348/239 |
| 9,232,143 B2* | 1/2016 | Jayaraj | ............... | H04N 5/23222 |
| 9,256,986 B2* | 2/2016 | Kasahara | ............. | G06T 19/006 |
| 9,596,404 B2* | 3/2017 | Fu | ...................... | H04N 5/23216 |
| 9,779,553 B2* | 10/2017 | Byrne | .................. | G06T 15/503 |
| 10,136,050 B2* | 11/2018 | Knodt | ................ | H04N 5/23222 |
| 10,462,371 B2* | 10/2019 | Oka | .................... | H04N 5/23216 |

(Continued)

*Primary Examiner* — Timothy J Henn
(74) *Attorney, Agent, or Firm* — Terrence J. Edwards; TechLaw Ventures, PLLC (57) ABSTRACT

Systems, methods, and devices for calculating an error between a current pose estimation of a camera and a first pose estimation of a camera. A method includes receiving a first image captured by a camera and a first parameter measured by an inertial measurement unit associated with the camera. The method includes calculating an initial pose estimation for the camera based on the first parameter and calculating a current pose estimation for the camera based on a real-time parameter measured by the inertial measurement unit associated with the camera. The method includes calculating an error between the current pose estimation for the camera and the initial pose estimation for the camera. The method includes determining whether the error is within an acceptable margin of error and, in response to determining the error is within the acceptable margin of error, providing an indication to capture a second image with the camera.

20 Claims, 8 Drawing Sheets

(56) References Cited

U.S. PATENT DOCUMENTS

| | | | |
|---|---|---|---|
| 2002/0140694 A1* | 10/2002 | Sauer | G06T 19/003 345/419 |
| 2005/0024517 A1* | 2/2005 | Luciano | H04N 1/00183 348/333.03 |
| 2007/0030363 A1* | 2/2007 | Cheatle | H04N 1/00183 348/239 |
| 2008/0129842 A1* | 6/2008 | Shibutani | H04N 1/00183 348/231.99 |
| 2009/0015702 A1* | 1/2009 | Garcia Alonso | H04N 5/23222 348/333.02 |
| 2010/0157128 A1* | 6/2010 | Choi | H04N 5/23248 348/333.03 |
| 2011/0279697 A1* | 11/2011 | Shingu | G06T 19/006 348/222.1 |
| 2012/0262593 A1* | 10/2012 | Choi | H04N 5/23219 348/211.99 |
| 2013/0155280 A1* | 6/2013 | Donatelli | H04N 5/23293 348/231.99 |
| 2014/0226052 A1* | 8/2014 | Kang | H04N 5/23222 348/333.02 |
| 2015/0237330 A1* | 8/2015 | Jang | G06T 7/579 348/52 |
| 2015/0373258 A1* | 12/2015 | Chuang | H04N 5/23222 348/333.04 |
| 2016/0140729 A1* | 5/2016 | Soatto | G01S 5/16 348/135 |
| 2017/0064208 A1* | 3/2017 | Salimpour | G06F 3/04847 |
| 2017/0078565 A1* | 3/2017 | Ito | H04N 5/23222 |
| 2017/0134646 A1* | 5/2017 | Lucero | H04N 5/23222 |
| 2017/0336220 A1* | 11/2017 | Broaddus | G01C 21/165 |
| 2017/0374280 A1* | 12/2017 | Chan | H04N 5/23222 |
| 2019/0073792 A1* | 3/2019 | Fletcher | G06T 7/74 |
| 2019/0096068 A1* | 3/2019 | Fontanel | G06T 7/73 |

\* cited by examiner

AUGMENTED REALITY MARKERS IN DIGITAL PHOTOGRAPHY

CROSS-REFERENCE TO RELATED APPLICATIONS

This application claims the benefit under 35 U.S.C. § 119(c) of U.S. Provisional Application No. 62/649,563 "SYSTEM AND METHOD USING AUGMENTED REALITY MARKERS IN PHOTOGRAPHY" filed Mar. 28, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The present disclosure relates to photography systems and methods and particularly relates to photography systems and methods using augmented reality.

BACKGROUND

Photography is an increasingly popular hobby with more and more individuals wishing to capture memories of vacations, activities, and other outings. Historically, photographic images with a professional or high end appearance were only captured by professional photographers or amateurs that spent considerable time developing a knowledge-base and skillset for capturing quality images. Before the advent of digital photography, a photographer needed to have extensive knowledge of different film stocks, film processing methods, and camera equipment to capture a quality image with good composure, lighting, and coloring. When digital photography equipment become readily accessible to consumers, many more people began capturing images of special occasions and daily events. Some digital cameras, especially "point and shoot" cameras, have internal processing instructions to automate several settings for an image such as white balance, aperture, and shutter speed. These settings control the coloring and lighting for an image such that an automated point and shoot camera can enable any amateur photographer to capture quality images.

However, even if the camera is configured to automate some settings for the image, a great deal of the quality of an image is attributable to the composure and framing for the image. The composure and framing for an image is impacted by the skill and knowledge of the person capturing the image. The composure and framing is determined by where the camera is located in relation to the scene being captured, how the camera is pointed or oriented, and whether the camera lens is zoomed in or out. For example, an image of a tourist standing in front of a famous landmark may be perfectly lit and have excellent white balance, but if the image cuts off the landmark, the image will likely be unsatisfactory to the tourist.

The introduction of smart phone cameras and social media has encouraged many people to capture images throughout their daily lives. More and more people want to document events in their lives, including vacations, outings with friends and family, projects at home, and so forth. Many people wish to be the subject of an image or wish to be in an image with other friends and family. For example, an image of a lunch outing with friends may be much more valuable to a person if the person is included in the image with his or her friends. However, without a tripod or other equipment, the person often will need to request a stranger to capture the image. Unfortunately, this can lead to the stranger capturing an image that is framed poorly or is otherwise disappointing to the person. The stranger may not have any knowledge of good photography composure and framing, and the stranger may not be invested in ensuring the image is framed well. Further, the person may have a specific idea of how the image should be framed but may not have the opportunity to convey this idea to the stranger who agreed to capture the image.

In light of the foregoing, disclosed herein are systems, methods, and devices for capturing an image with the aid of augmented reality to enable a photographer to retain control over the framing of an image when the photographer cannot personally capture the image.

BRIEF DESCRIPTION OF THE DRAWINGS

Non-limiting and non-exhaustive implementations of the present disclosure are described with reference to the following figures, wherein like reference numerals refer to like or similar parts throughout the various views unless otherwise specified. Advantages of the present disclosure will become better understood with regard to the following description and accompanying drawings where.

DETAILED DESCRIPTION

Disclosed herein are systems, methods, and devices for providing augmented reality markers to aid in capturing an image. The systems, methods, and devices disclosed herein enable a first user to determine a desired framing and composure for an image, stand within the frame of the camera to be a subject of the image, and have a second user capture the image according to the first user's desired framing and composure. In an embodiment, the first user may capture a guidance image with a camera according to the first user's desired framing and composure of a scene. The first user may provide the camera to a second user and then stand within the scene to be a subject of a final image. The camera may be configured to provide the second user with augmented reality markers to guide the second user to capture the final image according to the first user's desired framing and composition.

Photography is an increasingly popular hobby, particularly with the advent of social media platforms and high-resolution smart phone cameras. Many people wish to capture images of special events, vacations, daily activities, get-togethers with friends and family, and so forth. In such scenarios, a photographer may wish to be a subject of the image and may also wish to have control over the framing and artistic elements of the image. In an instance where a photographer must ask a bystander to capture an image, so the photographer may stand within the frame, the photographer may be dissatisfied with the final image as captured by the bystander. Often, a bystander will not have the same interest in producing a quality image or the bystander may have different artistic judgment from the photographer-subject. This may result in a poor-quality image or an image that is different from what the photographer-subject would have captured.

For example, in an instance where a photographer is on vacation and wishes to have an image of himself standing in front of a landmark, the photographer may ask a bystander to capture the image. The photographer may seek out a bystander and ask the bystander to capture the image. The bystander might be a stranger to the photographer and may not have the same interest in capturing a quality image of the photographer-subject. The final image may include framing issues, such as cutting off the landmark, cutting off the photographer, tilted framing, and/or a lack of artistic vision in the overall framing of the image. In such a scenario, the photographer-subject has more interest in the quality and composition of the image than the bystander who captured the image. For the photographer-subject, the image might be an important souvenir from a once-in-a-lifetime vacation and the photographer-subject might wish to have significant control over the quality and framing of the image while still having the benefit of standing within the image frame. The systems, methods, and devices disclosed herein enable the photographer-subject to retain control over the final image without needing to personally capture the final image.

In an embodiment of the disclosure, a photographer-subject (may be referred to herein as a "first user") may wish to retain control over the composition and framing of an image while also being a subject of the image, either alone or in combination with other subjects. The first user may ask a nearby person or stranger to capture the image. Historically, the first user must relinquish all control of the aesthetics of the final image to the nearby person or stranger (may be referred to herein as a "second user"). The second user may not be invested in the appearance of the final image and may provide unsatisfactory results to the first user. The second user may not have any training in photography and may not have the skillset or knowledge to capture an image with good framing and composure. Further, the first user may have a unique taste or may wish for the image to be captured with specialized or unexpected framing, and the first user may not know how to effectively convey this desire to the second user. The systems, methods, and devices disclosed herein enable the first user to determine the composition and framing of the image, provide a camera to the second user, and configure the camera to guide the second user to capture the image with the first user's desired composition and framing by way of augmented reality markers.

In an example implementation of the systems, methods, and devices disclosed herein, a first user wishes to capture an image of a group of people standing in front of a landmark, and the first user wishes to be in the image with the group of people. In the example implementation, the first user asks the group of people to stand in front of the landmark and may take the time to arrange the group of people and/or instruct one or more persons in the group of people to move or stand in a different position. The first user may determine a desired framing for the image such that every person in the group of people can be seen, so the landmark can be seen, and so the lighting is desirable. The first user may then capture a guidance image with the desired framing. The first user may then provide the camera to the second user and join the group of people to be part of the final image. The camera may be configured to provide augmented reality markers to the second user to guide the second user to capture a final image according to the same framing of the guidance image. The second user may view the scene through a screen or viewfinder on the camera and may use the augmented reality markers on the camera to adjust where the camera is located, how the camera is pointed, and/or how the lens of the camera is zoomed, until the augmented reality markers indicate that the camera is configured to capture a final image that is similar to the guidance image in framing and composition. The second user may then capture the final image according to the guidance provided by the augmented reality markers such that the final image is satisfactory to the first user.

Before the methods, systems, and devices for augmented reality markers in digital photography are disclosed and described, it is to be understood that this disclosure is not limited to the configurations, process steps, and materials disclosed herein as such configurations, process steps, and materials may vary somewhat. It is also to be understood that the terminology employed herein is used for describing implementations only and is not intended to be limiting since the scope of the disclosure will be limited only by the appended claims and equivalents thereof.

In describing and claiming the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for clarity, certain technical material that is known in the related art has not been described in detail to avoid unnecessarily obscuring the disclosure.

Figure 1:
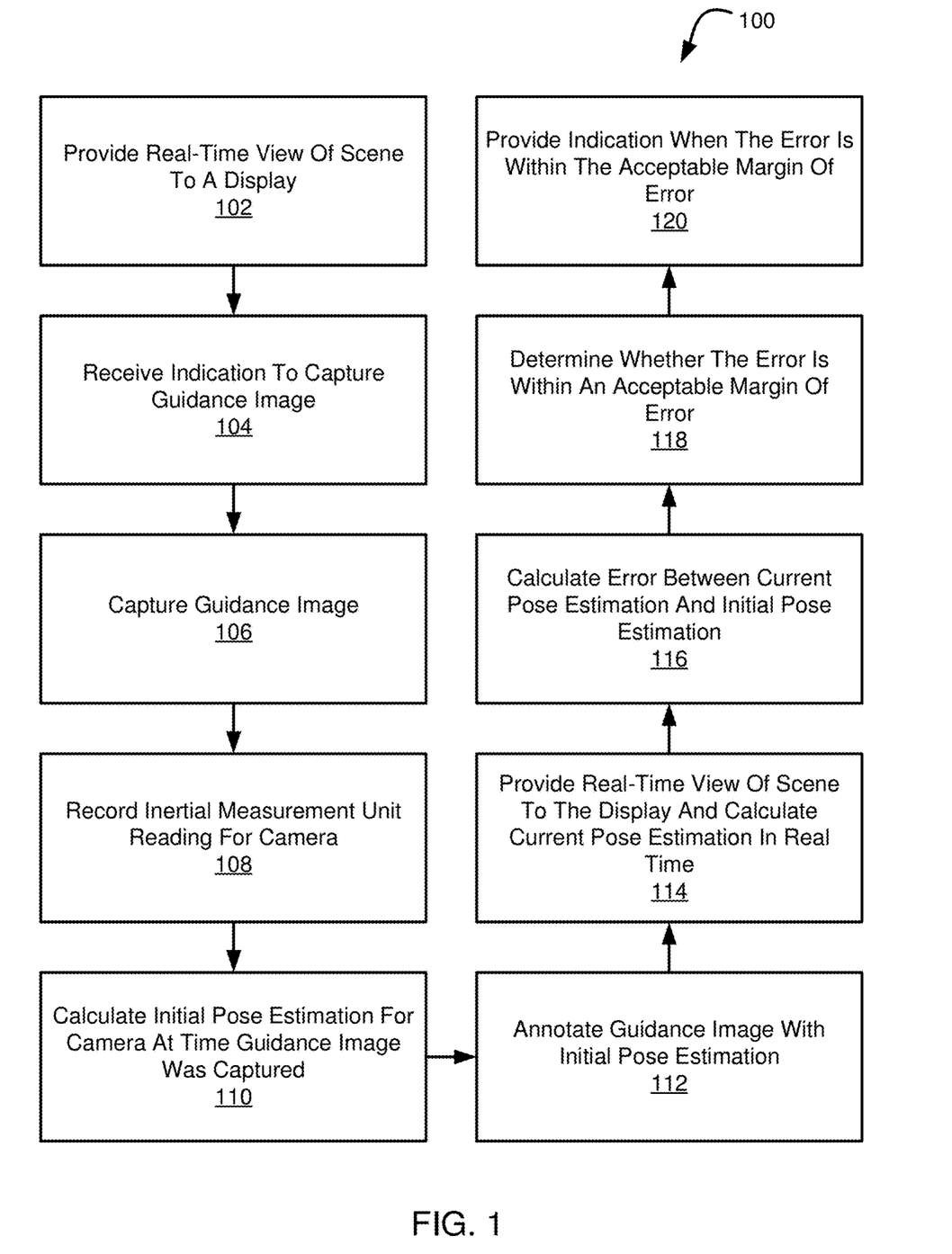
FIG. 1 is a block diagram illustrating a process flow for augmented reality photography, according to one embodiment.

Referring now to the figures, FIG. 1 illustrates a process flow 100 for capturing an image using augmented reality. The process flow 100 may be implemented by a processor that is configurable to executed instructions stored in computer readable storage media. In an embodiment, the process flow 100 is executed by a computing device having a processor such as a mobile phone, a tablet, a personal computer, a laptop, a digital camera, and so forth. In an embodiment, the process flow 100 is executed by a computing device in connection with a digital viewfinder of a film camera.

The process flow 100 begins and the computing device provides at 102 a real-time view of a scene to a display. The display may include a digital image display on a personal computing device such as a smart phone, tablet, computer, or digital camera. In an implementation, the display may be viewed by a first user, wherein the first user wishes to capture a guidance image with a certain composition and/or framing as determined by the first user.

The process flow 100 continues and the computing device receives at 104 an indication to capture the guidance image. The computing device may receive at 104 an indication that the first user has activated a button or issued a voice command, that a camera timer has gone off, that a camera remote shutter has fired, and so forth. In response to receiving the indication to capture the guidance image, the computing device captures at 106 the guidance image. The computing device may store the guidance image in memory, including in cache memory and/or persistent storage.

The computing device records at 108 a reading from an inertial measurement unit associated with the camera. In an embodiment, the computing device simultaneously records at 108 the reading from the inertial measurement unit and captures at 106 the guidance image. In an embodiment, the camera is integrated into a smart phone mobile computing device, and the smart phone mobile computing device further includes the inertial measurement unit. In an embodiment, the camera is a standalone digital camera that further includes the inertial measurement unit.

The inertial measurement unit is an electronic device that measures and reports the specific force and angular rate of the camera and/or other computing device that is associated with the inertial measurement unit. In an embodiment, the inertial measurement unit provides the specific force and angular rate for a smart phone mobile computing device that includes the camera. These measurements may approximate the measurements for the image sensor in the camera but might not provide exact measurements for the camera itself. The inertial measurement unit may use a combination of accelerometers, gyroscopes, and magnetometers to provide appropriate readings to the computing device.

The computing device calculates at 110 an initial pose estimation for the camera at the time the guidance image was captured. The initial pose estimation may include a combination of the camera's position in world coordinates and the camera's orientation in world coordinates. In an embodiment, the initial pose estimation is calculated by way of a visual inertial odometry algorithm.

The computing device annotates at 112 the guidance image with the initial pose estimation. In an embodiment, the computing device stores the guidance image in memory and includes the initial pose estimation as metadata associated with the guidance image.

The computing device provides at 114 a real-time view of the scene to the display and calculates a current pose estimation for the camera in real time. In an implementation, after the guidance image and the initial pose estimation have been stored in memory, and after the first user has accepted the guidance image, the first user provides the camera to a second user. The second user may view the scene by way of a display or digital viewfinder on the camera. As the second user views the scene by way of the display, the computing device further calculates a current pose estimation of the camera in real time. The current pose estimation of the camera may be calculated based on readings from the inertial measurement unit and further based on the visual inertial odometry algorithm. The visual inertial odometry algorithm uses data from the inertial measurement unit and features from the guidance image to determine the current pose estimation for the camera. As the second user moves in space, the readings from the inertial measurement unit will change. Further as the second user changes the orientation of the camera, the readings from the inertial measurement unit will change. The current pose estimation of the camera will be adjusted in real time as the second user changes the position and orientation of the camera.

The computing device calculates at 116 the error between the current pose estimation and the initial pose estimation. In an embodiment, the computing device provides this error to the display such that the second user may view the error in real time as the second user changes the position and orientation of the camera. In an embodiment, the error is displayed in the form of augmented reality markings or crosshairs on the display (see, e.g. FIG. 5). The error is an indication of the difference between the current pose estimation of the camera and the initial pose estimation of the camera.

The computing device determines at 118 whether the error between the current pose estimation and the initial pose estimation is within an acceptable margin of error. The acceptable margin of error between the current pose estimation and the initial pose estimation may be different for different aspects or parameters of the camera's orientation and position. For example, the margin of error for moving the camera up, down, left, or right with respect to the scene (i.e., moving the camera within the x and y axes) may be smaller than the margin of error for moving the camera forward or backward with respect to the scene (i.e., moving the camera within the z axis). This may be because moving the camera up, down, left, or right has a greater impact on the composition of the image than stepping forward or backward with respect to the scene. Each parameter for the position and/or orientation of the camera may have a different acceptable margin of error.

The computing device provides at 120 an indication when the error between the current pose estimation and the initial pose estimation is within the acceptable margin of error. In an embodiment, the error is not within the acceptable margin of error until each parameter for the camera's position and/or orientation is within its corresponding acceptable margin of error. For example, the error for the x-axis must be within the x-axis acceptable margin of error, the error for the y-axis must be within the y-axis acceptable margin of error, and the error for the z-axis must be within the z-axis acceptable margin of error. In an embodiment, the indication that the error is within the acceptable margin of error includes a notification such as a visual notification, a sound, or a vibration. The indication may provide a notification to the second user that the current camera pose is aligned with the initial camera pose such that the image sensor of the camera is positioned to capture a final image that is similar in composition to the guidance image. In an embodiment, the indication includes markings or cross hairs that are aligned to indicate the current camera pose is within the acceptable margin of error (see, e.g. FIG. 6).

Figure 2A:
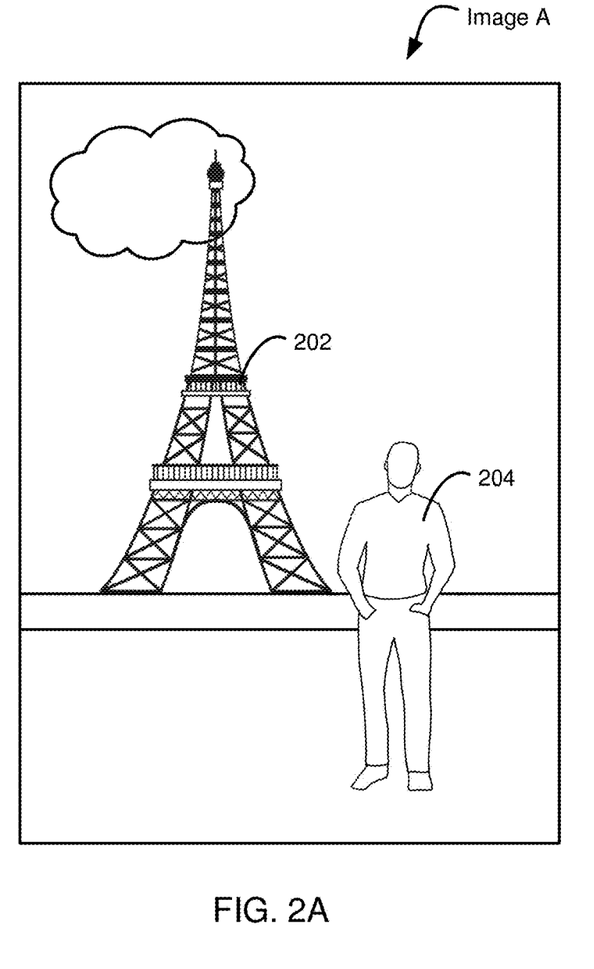
FIGS. 2A and 2B illustrate example images captured by a camera.
Figure 2B:
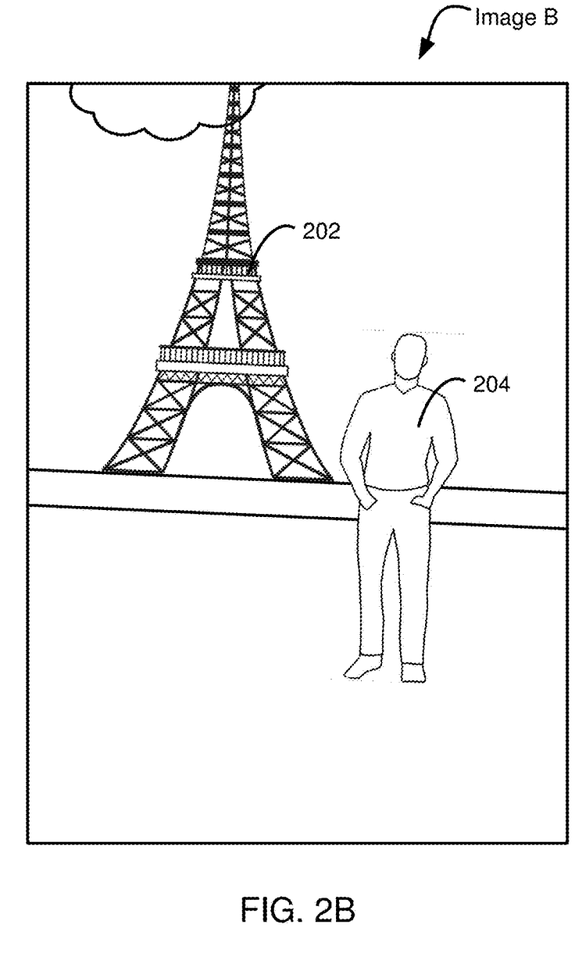

FIGS. 2A and 2B depict two images capturing the same scene with different framing and composition. FIG. 2A depicts image A and FIG. 2B depicts image B. Image A and image B capture the same scene that includes a person 204 and a landmark 202. As illustrated in the comparison of FIGS. 2A and 2B, the same scene may be captured with different framing and composition. The framing and composition of image A ensures that the landmark 202 is fully visible and the person 204 can be seen standing upright. The framing and composition of image B cuts off a top portion of the landmark 202 and has the scene on a tilt such that the roadway, the landmark 202, and the person 204 are not oriented properly to match how the scene would be viewed with the naked eye.

In an example implementation, the person 204 captured in the scene in image A and image B may have requested that the image be captured by a bystander so the person 204 could stand in front of the landmark 202 for the photograph. Depending on the artistic taste of the person 204, the person 204 may be disappointed with image B because the framing and composition is crooked and causes the landmark 202 to be cut off. The person 204 may be motivated to ensure that the image is composed similar to image A. The person 204 may be motivated to implement the systems, methods, and devices disclosed herein to provide a bystander with augmented reality markers that guide the bystander to capture an image similar to image A.

Figure 3:
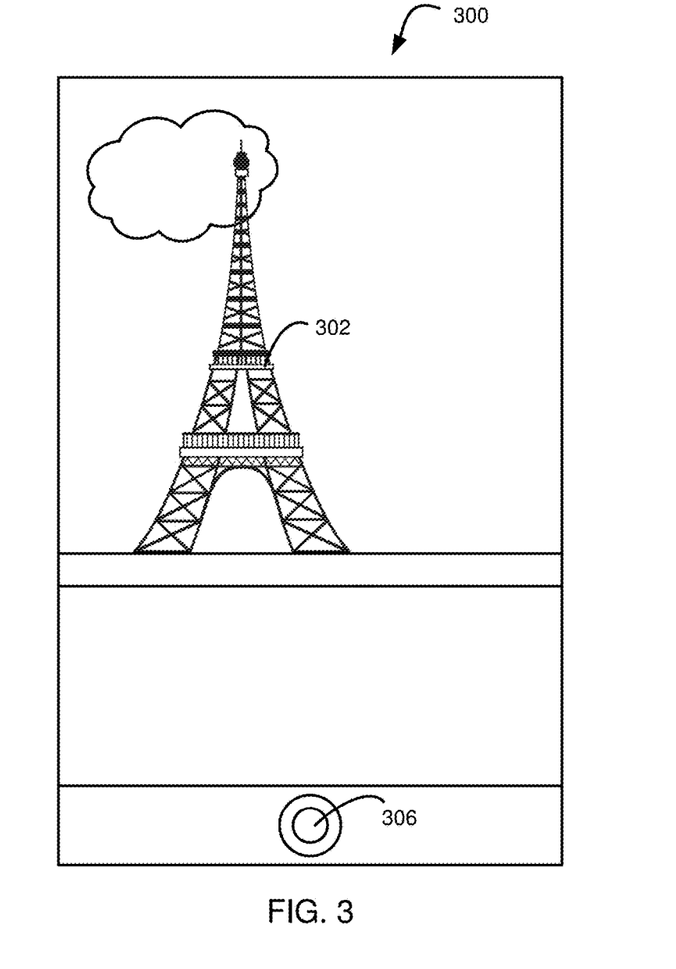
FIG. 3 is an example screenshot of a guidance image capture phase of a program, according to one embodiment.
Figure 4:
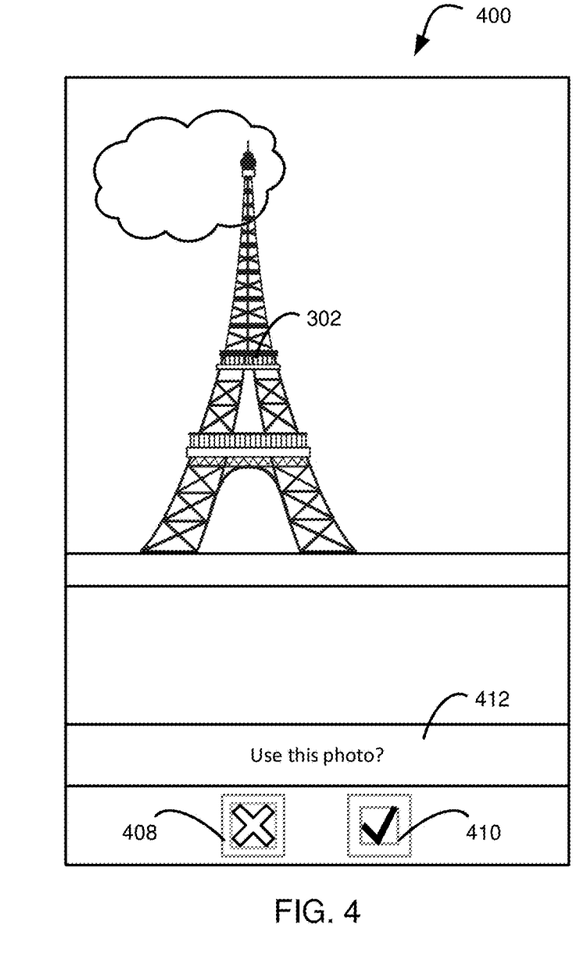
FIG. 4 is an example screenshot of a guidance image selection phase of a program, according to one embodiment.
Figure 5:
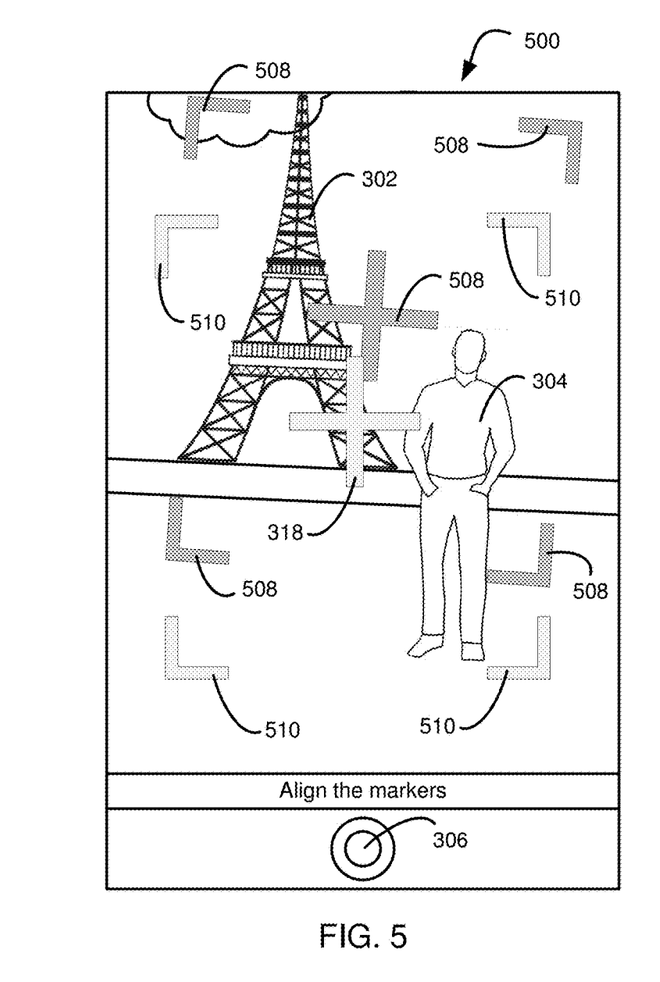
FIG. 5 is an example screenshot of an error estimation phase of a program, according to one embodiment.
Figure 6:
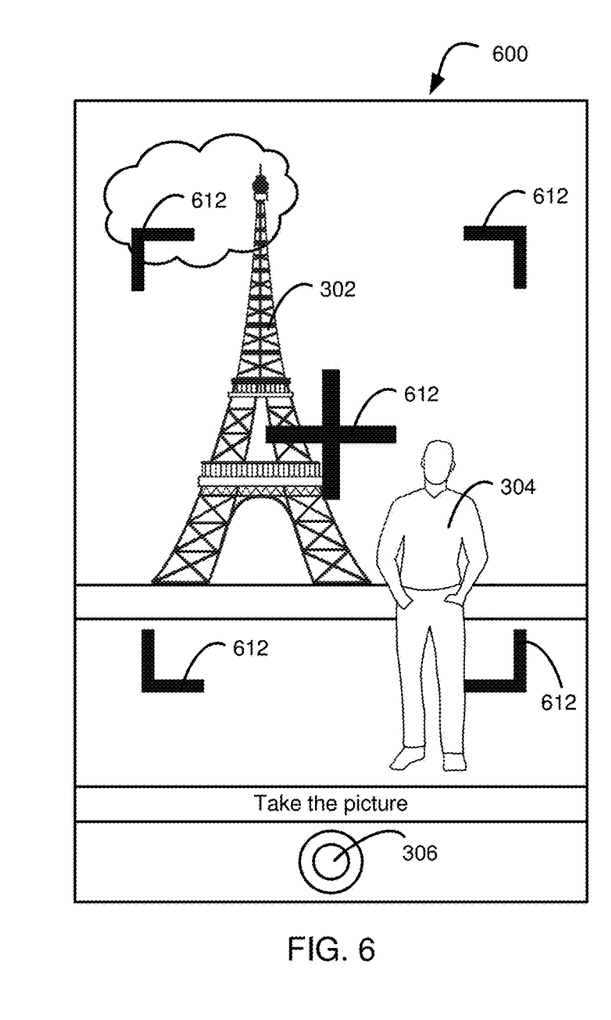
FIG. 6 is an example screenshot of an acceptable margin of error phase of a program, according to one embodiment.

FIGS. 3-6 are screenshots of an example program for providing augmented reality markers such that a final image may have similar framing and composition to a guidance image. The screenshots of the program in FIGS. 3-6 illustrate different phases of the program. FIG. 3 is an example screenshot of the guidance image capture phase 300. FIG. 4 is an example screenshot of the guidance image selection phase 400. FIG. 5 is an example screenshot of the error estimation phase 500. FIG. 6 is an example screenshot of the acceptable margin of error phase 600.

FIG. 3 is an example screenshot of a program for providing augmented reality markers such that a final image may have similar framing and/or composition to a guidance image. FIG. 3 is an example screenshot of the guidance image capture phase 300 for the program. The guidance image capture phase 300 may be the first phase of the program when a first user composes an image according to the first user's preferences. The first user captures the guidance image in accordance with the first user's preferences for framing, composition, positioning, and so forth. The guidance image will ultimately provide an indication of how the final image should be framed.

During the guidance image capture phase 300, a computing device may provide a real-time view of a scene on a display or electronic viewfinder. In an embodiment, the computing device is a smart phone mobile computing device or a tablet that is in communication with an image sensor of an integrated or attached camera. The display of the smart phone mobile computing device and/or the tablet provides a real-time depiction of the scene as captured by the image sensor. As the position and/or orientation of the camera is adjusted by the first user, the real-time depiction of the scene will also be adjusted to match the scene as captured by the image sensor.

In the example illustrated in FIGS. 3-6, the scene includes a landmark 302. The first user may activate a button 306 to indicate to the program that the guidance image should be captured. The button 306 may be a digital button on a touchscreen device, a digital button in communication with some other device such as a mouse or keyboard, and/or a physical button integrated into a smart phone, tablet, digital camera, or other device. The first user may indicate that a picture should be captured by activating the button 306 by the appropriate means. In an embodiment, the button 306 is a digital button depicted on a display screen of a smart phone mobile computing device or tablet, and the first user activates the button 306 by tapping the display screen at the button 306. When the button 306 is activated, the computing device captures the guidance image with the image sensor. The image may be stored in memory, including in cache memory and/or persistent storage.

In an embodiment, the computing device is further configured to receive one or more sensor readings from inertial measurement unit at the time the image is captured by the camera. The inertial measurement unit may be integrated into a computing device such as a smart phone, tablet, or digital camera. The inertial measurement unit may constantly provide updated readings in real-time and the readings may be read by the computing device at the time the guidance image is captured.

In an embodiment, the process of capturing the guidance image is the standard process for capturing an image on the applicable device. In an implementation where the image is captured with a smart phone camera, the scene that is captured by the image sensor of the smart phone camera may be displayed in real-time on a screen of the smart phone, and the user may push a button or tap the screen to provide an indication that the image should be captured. The processor (s) of the smart phone may store an image in memory upon receiving the indication from the user that the image should be captured.

FIG. 4 is an example screenshot of the program in a guidance image selection phase 400. In FIG. 4, an image has been captured and the image includes the landmark 302 in the scene as shown in the example in FIG. 3. The guidance image selection phase 400 includes selecting the guidance image and annotating the guidance image with the initial pose estimation for the camera.

In an embodiment of the guidance image selection phase 400, the program is configured to provide an option to the first user to accept or decline the guidance image. The program is configured to display the guidance image to the first user and query the first user whether the guidance image should be saved (see 412). The program is configured to provide a decline button 408 and an accept button 410 to the first user such that the first user may provide an indication whether the guidance image should be saved or discarded.

The first user may decline the image by tapping the decline button 408 to indicate that the first user is not satisfied with the captured guidance image and wishes to capture a new guidance image. As illustrated in the example screenshot depicted in FIG. 4, the decline button 408 may include a digital button integrated into a display screen of a computing device, and the digital button may be a word or image suggesting that the user is not satisfied with the image. In the example screenshot illustrated in FIG. 4, the decline button 408 may be a cross or "X" mark. It should be appreciated that the user may decline the image by any suitable means, including by issuing a voice command, hand gesture, and/or finger gesture, or activating a physical button or a digital button, and so forth.

In response to receiving an indication that the user has declined the guidance image, instructions may cause a computer processor to return to the guidance image capture phase 300 of the program. In response to receiving an indicating that the user has accepted the guidance image, instructions may cause a computer processor to save the guidance image to memory, calculate the initial pose estimation for the camera at the time the guidance image was captured, and annotate the guidance image with the initial pose estimation.

The first user may accept the image by tapping the accept button 410 to indicate that the first user is satisfied with the guidance image. As illustrated in the example screenshot depicted in FIG. 4, the accept button 410 may include a digital button integrated into a display screen of a computing device, and the digital button may be a word or image that suggests the user is satisfied with the image and wishes to use the image as the guidance image. In the example screenshot illustrated in FIG. 4, the accept button 410 may be a checkmark. It should be appreciated that a user may accept the image by any suitable means, including by issuing a voice command, hand gesture, and/or finger gesture, or activating a physical button or a digital button, and so forth.

In response to receiving an indication that the user is satisfied with the image, instructions may cause a computer processor to store the image to memory with an indication that the image should serve as the guidance image. Further in response to receiving the indication that the user is satisfied with the image, the computer processor may be configured to retrieve and/or read sensor readings from an inertial measurement unit, wherein the sensor readings were captured at the time the guidance image was captured. The inertial measurement unit may be integrated into the same computing device associated with the camera. In an embodiment, the computing device is a smart phone that includes the camera and the inertial measurement unit.

In response to the user accepting the image, the guidance image selection phase 400 includes calculating and/or recording the initial pose estimation for the camera. The initial pose estimation corresponds to the time the guidance image was captured by the camera. The initial pose estimation is a combination of the camera's position in world coordinates and orientation in world coordinates at the time the guidance image was taken.

In an embodiment, the initial pose estimation for the camera is determined by the program in real-time using visual inertial odometry. The visual inertial odometry algorithm uses a monocular camera coupled with linear acceleration and angular velocity from the inertial measurement unit to generate an estimate of the camera's pose. This may be accomplished by tracking feature points between image frames. The tracking of feature points between image frames may be implemented by a neural network in some embodiments. Using the feature points, the visual inertial odometry algorithm calculates an essential matrix which is a 3×3 matrix that relates images from two perspectives and then decomposes the images to obtain the relative poses between image pairs. The data from the inertial measurement unit may be used to filter and refine the initial pose estimation. When used alone, a monocular camera may only estimate relative position without absolute scale. However, absolute scale must be known to calculate actual size or distance between the image sensor and an object in a scene. The actual size or distance may be calculated using data provided by the inertial measurement unit.

In an embodiment, the visual inertial odometry algorithm is initialized in response to a user capturing the guidance image. The position and orientation of the camera at the time the image was captured are marked as the initial pose estimation for the camera. This initial pose estimation is used to provide guidance markers (see 508) and live markers (see 510) when a second user is orienting the camera to capture a final image with the same composition of the guidance image.

FIG. 5 is an example screenshot of the program in the error estimation phase 500. The error estimation phase 500 includes calculating a current pose estimation for the camera in real-time as the position and/or orientation of the camera is changed. The error estimation phase 500 includes comparing the current pose estimation with the initial pose estimation to determine the error between the current pose estimation and the initial pose estimation. The error estimation phase 500 includes providing augmented reality markers to a user that indicate the difference (i.e., the error) between the current position and orientation of the camera and the desired position and orientation of the camera.

In an example implementation, the guidance image is captured by a first user and the first user hands the camera off to a second user so that the second user can capture the final image with the same composition and/or framing as the guidance image. This enables the first user to stand within the scene of the image and still maintain control over the composition and framing of the final image. The second user captures the final image by following augmented reality markers that illustrate how the camera should be moved or oriented, so the final image has the same composition and/or framing as the guidance image.

In an embodiment, the current pose estimation of the camera is determined in the same fashion as the initial pose estimation of the camera by way of visual inertial odometry. The program further calculates the error between the current pose estimation and the initial pose estimation in real-time. This error calculation is provided to the second user in real-time to guide the second user to adjust the position and/or orientation of the camera until the composition of the final image is similar to the composition of the guidance image. In an embodiment, the error calculation is provided to the second user by way of augmented reality markers.

In an embodiment, the augmented reality markers include guidance markers 508 and live markers 510. The live markers 510 indicate the current pose of the camera and the guidance markers 508 indicate the pose of the camera when the guidance image was taken. The augmented reality markers may be overlaid on the scene as captured by the image sensor in real-time.

The guidance markers 508 provide an indication of how the scene was framed in the guidance image when the guidance image was captured by the first user (see FIG. 4). The guidance markers 508 are an indication of the position and orientation of the camera in the initial pose of the camera as determined based on the position and orientation of the camera when the guidance image was captured. In an embodiment, the position and orientation of the camera when the guidance image was captured is determined by implementing the visual inertial odometry algorithm that compares successive images captured by the camera and is further based on data from an inertial measuring unit. The guidance markers 508 are used to communicate the first user's intended image composition to the second user. The guidance markers 508 may include any suitable markers for communicating the intended image composition. In the example screenshot illustrated in FIG. 5, the guidance markers 508 include crosshair markers. In an embodiment, the guidance markers 508 are three-dimensional markers.

The live markers 510 provide an indication of how the scene is currently framed with respect to the guidance image (see FIG. 4). The live markers 510 indicate the current position and orientation of the camera with respect to the initial pose of the camera as determined when the guidance image was captured.

In an embodiment, the live markers 510 are two-dimensional (2D) markers and the guidance markers 508 are three-dimensional (3D) markers. In such an embodiment, the live markers 510 provide a 2D representation of how the current image is composed. The guidance markers 508 provide a 3D representation of how the guidance image was composed. The two sets of markers indicate the difference between the current pose of the camera and the initial pose of the camera. The 3D guidance markers 508 may indicate that the camera should be moved forward or backward (i.e. the second user should step closer to the scene or move farther away from the scene). The use of 2D and 3D markers provides unexpectedly good results in prompting the second user to properly orient the camera. The use of 2D and 3D markers is especially effective for indicating how the current position and orientation of the camera is different from the desired position and orientation of the camera.

FIG. 6 is an example screenshot of the program in an acceptable margin of error phase 600. The acceptable margin of error phase 600 includes determining whether one or more parameters of the current pose estimation are within an acceptable margin of error with respect to the initial pose estimation. The acceptable margin of error phase 600 includes determining whether all parameters of the current pose estimation are within the corresponding acceptable margin of error for that parameter with respect to the initial pose estimation. The acceptable margin of error phase 600 includes generating a prompt that the second user should capture the final image when the current pose estimation is within the acceptable margin of error and/or automatically capturing the final image when the current pose estimation is within the acceptable margin of error.

The acceptable margin of error phase 600 includes determining whether one or more parameters of the current pose estimation is within the corresponding acceptable margin of error with respect to the initial pose estimation. In an embodiment, the error between the initial pose of the camera and the current pose of the camera is calculated based on the difference in orientation and the difference in the x, y, and z axes between the initial pose and the current pose. In an embodiment, the different in orientation is based on the difference in Euler angles. In an embodiment, the margin of acceptable error varies in the x, y, and z axes. In an embodiment, the margin of error for a difference in the x or y axis is smaller than a difference in the z axis. In such an embodiment, the margin of error is different for the x and y axes with respect to the z axis because moving a camera up, down, left, or right (i.e. changing the position along the x or y axes) has a more dramatic effect on the composition and framing of an image than moving the camera forward or backward (i.e. changing the position along the z axis). In an embodiment, a specific margin of error is specified for each of the x, y, and z axes such that the x and y axes have a smaller acceptable margin of error than the z axis.

In an embodiment, the closer the phone is to the intended position (i.e., the position of the phone when the guidance image was captured), the more room there is for rotational error. The threshold for roll (phi), pitch (theta), and yaw (psi) increases as the phone is closer to the intended position. We define roll to be the rotation around the axis tangent to the viewing direction. Roll has a smaller acceptable margin of error threshold than pitch or yaw. The roll has a more dramatic effect on the framing and composition of the final image than the pitch or yaw. In an embodiment, the pitch and yaw have the same acceptable margin of error.

The acceptable margin of error phase 600 includes presenting augmented reality alignment markers 612 when the current position of the camera is within the acceptable margin of error with respect to the initial position. The alignment markers 612 may have a different appearance compared with the guidance markers 508 and/or the live markers 510. In an embodiment, the alignment markets 612 indicate the guidance markers 508 are overlapping the live markers 510 to a threshold degree and the camera is therefore positioned correctly to imitate the framing of the guidance image. When the guidance markers 508 are aligned with the live markers 510, the program further provides an indication to the user to take the image.

In an embodiment, the alignment markers 612 change color or provide some other indication when the current pose is within an acceptable margin of error with respect to the initial pose. In an embodiment, the alignment markers 612 turn green to indicate the final image should be captured. In an embodiment, when the current pose is within the acceptable margin of error with respect to the initial pose, the program can automatically capture the final image. In an embodiment, the user may activate a setting such that the program automatically captures the final image when the current pose is within the acceptable margin of error.

In an embodiment, the acceptable margin of error is programmed by a developer and cannot be adjusted by a user. In an embodiment, two or more possible acceptable margins of error are presented to the user and the user may select the acceptable margin of error that should be applied. In an embodiment, the user may adjust parameter-specific margins of error for each parameter of the camera pose.

Figure 7:
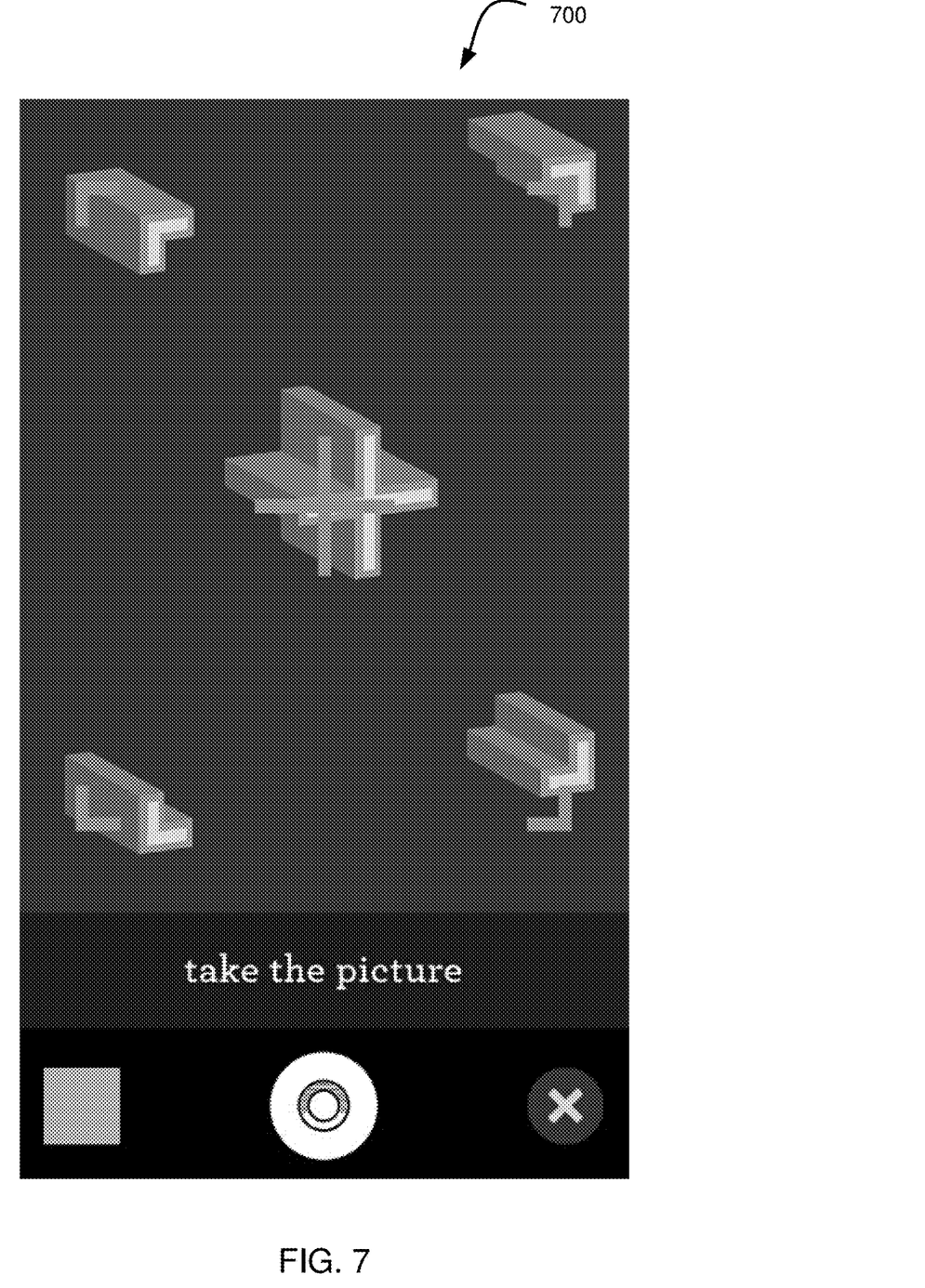
FIG. 7 is an example screenshot of two-dimension and three-dimensional augmented reality markers, according to one embodiment.

FIG. 7 is an example screenshot of an implementation of a program 700 that provides augmented reality markers. As illustrated in FIG. 7, the augmented reality markers may include a combination of 2D markers and 3D markers. In an embodiment, the 3D markers are live markers that indicate the composition of the guidance image. In an embodiment, the 2D markers are the guidance markers that indicate how the current pose of the camera is different with respect to the initial pose of the camera.

As illustrated in FIG. 7, the combination of 2D markers and 3D markers can enhance the effectiveness of the program 700 in indicating how the current camera pose should be adjusted. The combination of the 2D markers and the 3D markers may be easier to understand and may assist the second user in quickly adjusting the camera pose such that the 3D markers align with the 2D markers. In certain instances, the second user may be a stranger to the first user and may not be invested in the final outcome of the image. Further, the second user may be in a hurry or may feel anxious about capturing the final image. In such instances, it may be particularly beneficial to provide a combination of 2D markers and 3D markers such that the second user quickly and effectively can discern how the camera pose should be adjusted.

The combination of 2D markers and 3D markers as shown in FIG. 7 provides panorama guidance and aesthetic guidance to the second user. The use of 3D markers conveys direction along the z-axis and may indicate to the second user that the second user should move forward or backward with respect to the scene so the second user can capture a final image that mimics the composition and framing of the guidance image. The combination of 2D and 3D markers provides an indication to the second user of three-dimensional movement, including x, y, z, roll, pitch, and yaw movement, so the second user can move the camera appropriately to mimic the framing of the guidance image. Without the use of 3D markers, the second user might only receive an indication of two-dimensional movement, i.e. whether the second user should move the camera up, down, left, or right.

In an embodiment, the markers are implemented in lieu of or in conjunction with an overlay-based interface that shows a semi-transparent copy of the guidance image overlaid on the camera preview. The overlay-based interface may work well when the scene is simple with a distinct landmark to align. When the scene is complex or the colors are similar, the images may be very difficult to align without the assistance of markers.

Figure 8:
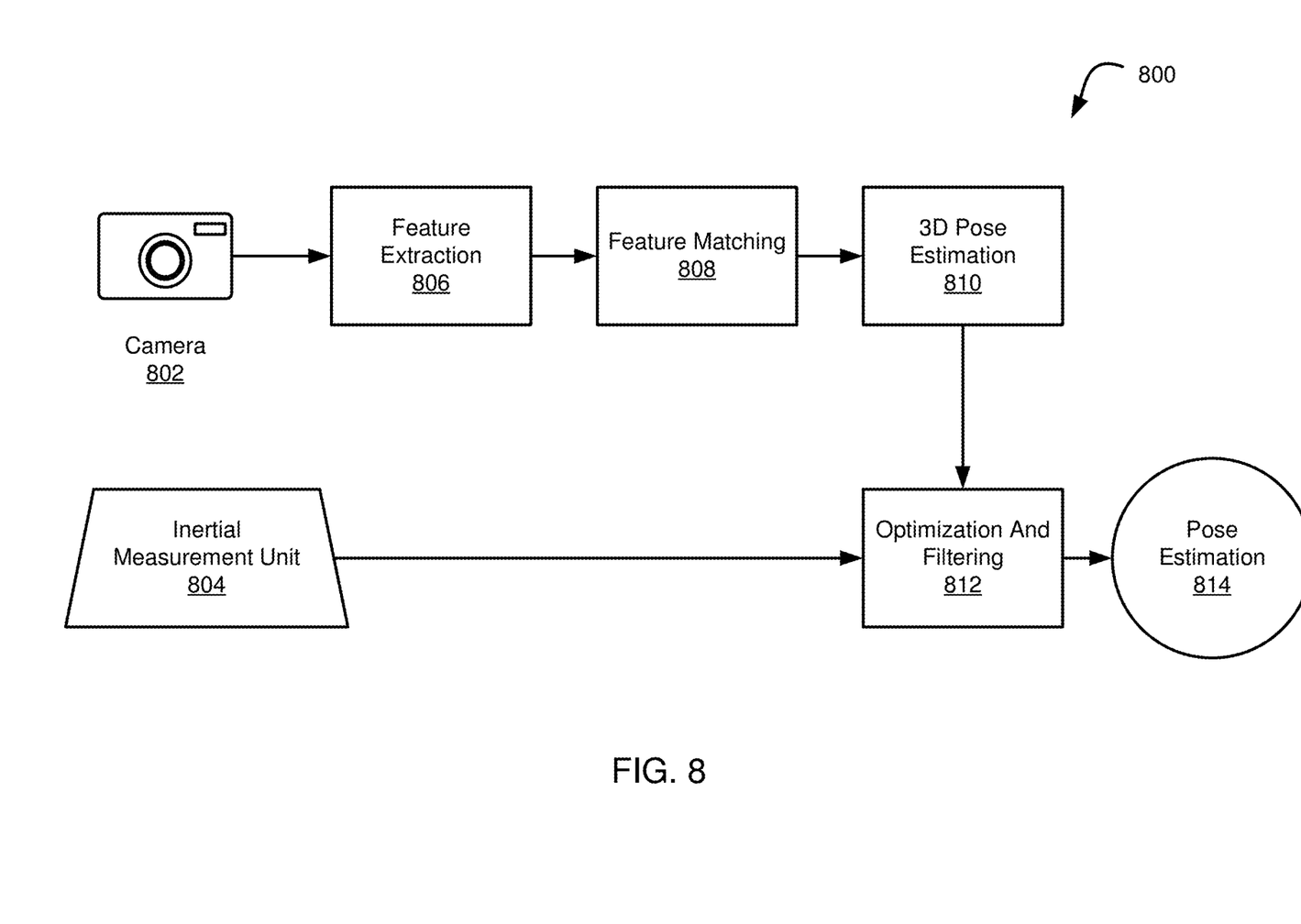
FIG. 8 is a schematic block diagram of a process flow for a visual inertial odometry algorithm, according to one embodiment.

FIG. 8 is a schematic block diagram of a process flow 800 of a visual inertial odometry ("VIO") algorithm. The process flow 800 includes receiving camera images from a monocular camera 802. The camera images may include sequential camera images that are captured in succession as the camera moves through space and/or the orientation of the camera is adjusted. The process flow 800 includes feature extraction 806 on the sequential camera images. The process flow 800 includes feature matching 808 on the features that were extracted from the sequential camera images. The process flow 800 includes 3D pose estimation 810 to determine how the camera is moving through space when the sequential camera images were captured. The process flow 800 includes receiving measurements from an inertial measurement unit 804. The process flow 800 includes optimizing and filtering 812 the 3D pose estimation 810 and the measurements from the inertial measurement unit 804. The process flow 800 includes determining the pose estimation 814 based on the monocular camera images and the measurements from the inertial measurement unit 804.

Figure 9:
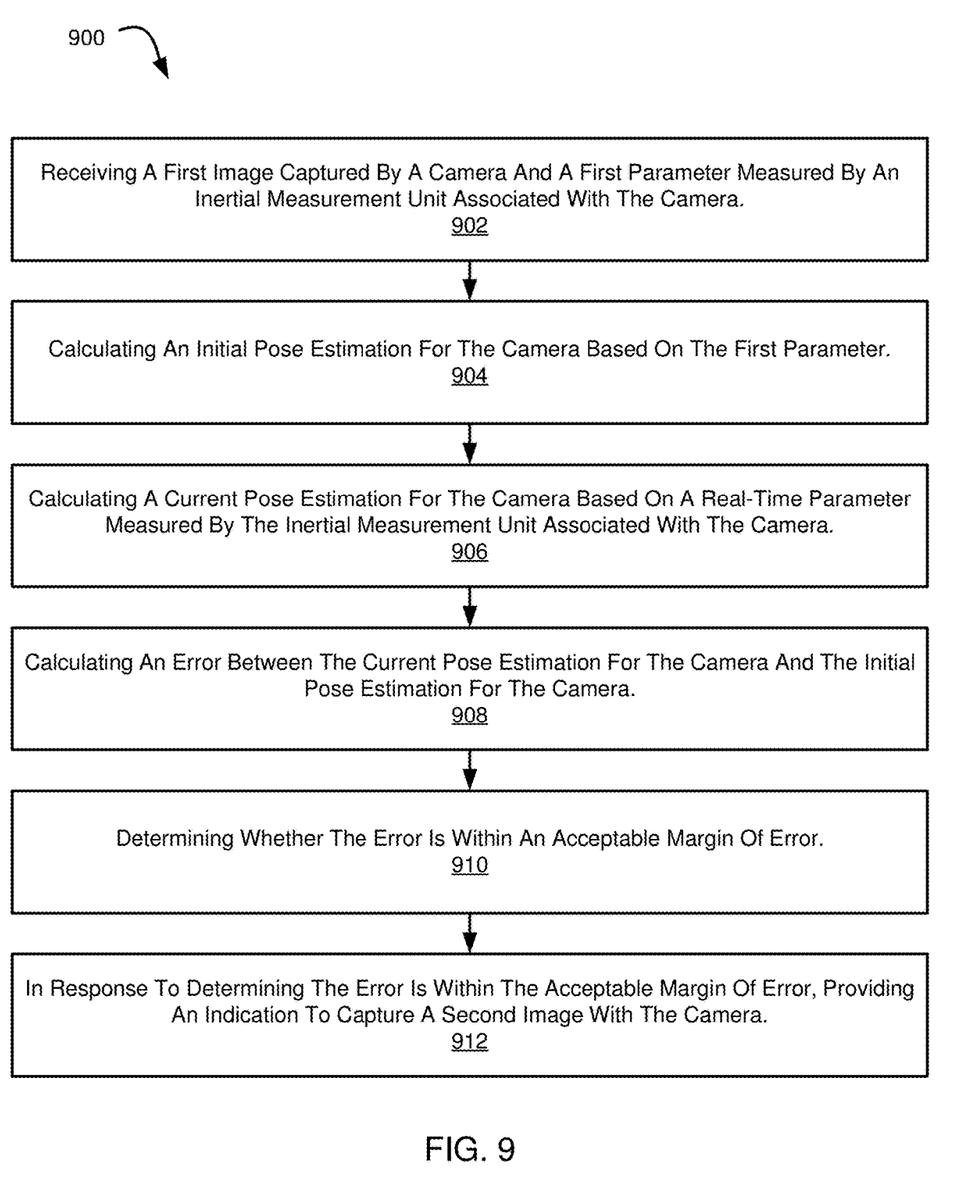
FIG. 9 is a schematic flow chart diagram of a method for calculating an error between a current pose estimation of a camera and an initial pose estimation of a camera, according to one embodiment.

FIG. 9 is a schematic flow chart diagram of a method 900 for calculating an error between a current pose estimation of a camera and a first pose estimation of a camera. The method 900 may be implemented by any suitable computing device, for example by a processor of a smart phone mobile computing device, a tablet, a digital camera, and so forth.

The method 900 begins and the computing device receives at 902 a first image captured by a camera and a first parameter measured by an inertial measurement unit associated with the camera. The method 900 continues and the computing device calculates at 904 an initial pose estimation for the camera based on the first parameter and calculates at 906 a current pose estimation for the camera based on a real-time parameter measured by the inertial measurement unit associated with the camera. The method 900 continues and the computing device calculates at 908 calculating an error between the current pose estimation for the camera and the initial pose estimation for the camera. The computing device determines at 910 whether the error is within an acceptable margin of error and, in response to determining the error is within the acceptable margin of error, the computing device provides at 912 an indication to capture a second image with the camera.

Figure 10:
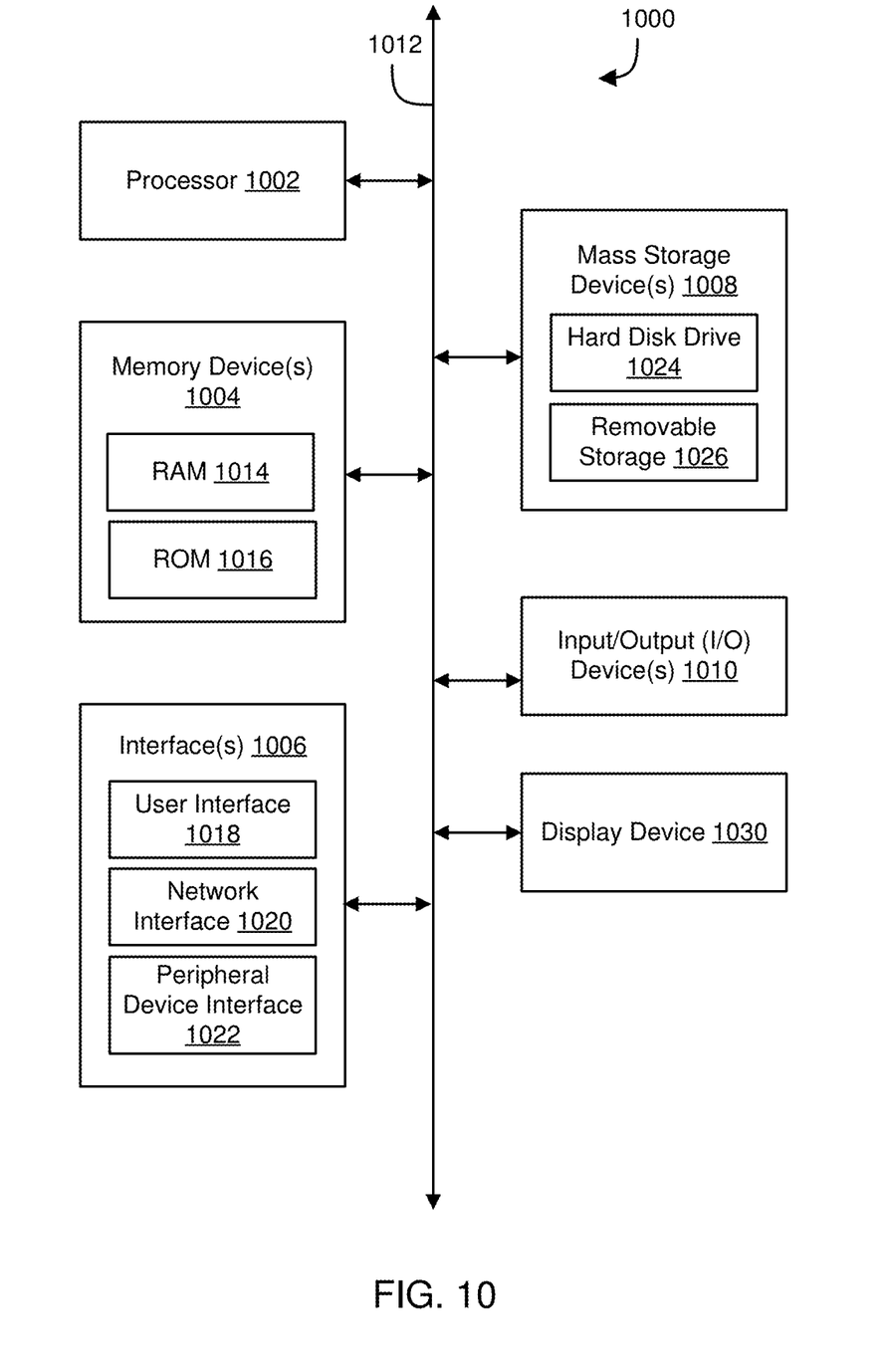
FIG. 10 is a schematic block diagram of an example computing system according to an example embodiment of the systems and methods described herein.

Referring now to FIG. 10, a block diagram of an example computing device 1000 is illustrated. Computing device 1000 may be used to perform various procedures, such as those discussed herein. Computing device 1000 can perform various monitoring functions as discussed herein, and can execute one or more application programs, such as the application programs or functionality described herein. Computing device 1000 can be any of a wide variety of computing devices, such as a desktop computer, in-dash computer, vehicle control system, a notebook computer, a server computer, a handheld computer, tablet computer and the like.

Computing device 1000 includes one or more processor(s) 1002, one or more memory device(s) 1004, one or more interface(s) 1006, one or more mass storage device(s) 1008, one or more Input/output (I/O) device(s) 1010, and a display device 1030 all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM) 1014) and/or nonvolatile memory (e.g., read-only memory (ROM) 1016). Memory device(s) 1004 may also include rewritable ROM, such as Flash memory.

Mass storage device(s) 1008 include various computer readable media, such as magnetic tapes, magnetic disks, optical disks, solid-state memory (e.g., Flash memory), and so forth. As shown in FIG. 1, a particular mass storage device is a hard disk drive 1024. Various drives may also be included in mass storage device(s) 1008 to enable reading from and/or writing to the various computer readable media. Mass storage device(s) 1008 include removable media 1026 and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, and the like.

Display device 1030 includes any type of device capable of displaying information to one or more users of computing device 1000. Examples of display device 1030 include a monitor, display terminal, video projection device, and the like.

Interface(s) 1006 include various interfaces that allow computing device 1000 to interact with other systems, devices, or computing environments. Example interface(s) 1006 may include any number of different network interfaces 1020, such as interfaces to local area networks (LANs), wide area networks (WANs), wireless networks, and the Internet. Other interface(s) include user interface 1018 and peripheral device interface 1022. The interface(s) 1006 may also include one or more user interface elements 1018. The interface(s) 1006 may also include one or more peripheral interfaces such as interfaces for printers, pointing devices (mice, track pad, or any suitable user interface now known to those of ordinary skill in the field, or later discovered), keyboards, and the like.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1000 and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

For purposes of illustration, programs and other executable program components are shown herein as discrete blocks, although it is understood that such programs and components may reside at various times in different storage components of computing device 1000 and are executed by processor(s) 1002. Alternatively, the systems and procedures described herein can be implemented in hardware, or a combination of hardware, software, and/or firmware. For example, one or more application specific integrated circuits (ASICs) can be programmed to carry out one or more of the systems and procedures described herein. As used herein, the terms "module" or "component" are intended to convey the implementation apparatus for accomplishing a process, such as by hardware, or a combination of hardware, software, and/or firmware, for the purposes of performing all or parts of operations disclosed herein. The terms "module" or "component" are intended to convey independent in how the modules, components, or their functionality or hardware may be implemented in different embodiments.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural, functional, object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components or modules, which are terms used to more particularly emphasize their implementation independence. For example, a component or module may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure.

What is claimed is:

1. A method comprising:
   determining a guidance image captured by a camera and a guidance parameter measured by an inertial measurement unit associated with the camera;
   calculating an initial pose estimation for the camera based on the guidance parameter;
   calculating a current pose estimation for the camera based on a real-time parameter measured by the inertial measurement unit associated with the camera;
   providing a current camera display comprising a depiction of a real-time reading of an image sensor of the camera;
   augmenting the current camera display with guidance image markers indicating the initial pose estimation for the camera; and
   augmenting the current camera display with live image markers indicating the current pose estimation for the camera.

2. The method of claim 1, wherein each of the initial pose estimation for the camera and the current pose estimation for the camera is based on a position of the camera in world coordinates and an orientation of the camera in world coordinates.

3. The method of claim 1, further comprising calculating an error between the current pose estimation and the initial pose estimation by one or more of:
   calculating a difference in orientation of the camera; or
   calculating a difference in x-axis, y-axis, and z-axis coordinates for the camera.

4. The method of claim 3, wherein calculating the error between the current pose estimation and the initial pose estimation further comprises one or more of:
   calculating an x-axis coordinate error indicating a difference between an x-axis coordinate for the initial pose estimation and an x-axis coordinate for the current pose estimation;
   calculating an x-axis orientation error indicating a difference between an x-axis orientation for the initial pose estimation and an x-axis orientation for the current pose estimation;

calculating a y-axis coordinate error indicating a difference between a y-axis coordinate for the initial pose estimation and a y-axis coordinate for the current pose estimation;

calculating a y-axis orientation error indicating a difference between a y-axis orientation for the initial pose estimation and a y-axis orientation for the current pose estimation;

calculating a z-axis coordinate error indicating a difference between a z-axis coordinate for the initial pose estimation and a z-axis coordinate for the current pose estimation; or calculating a z-axis orientation error indicating a difference between a z-axis orientation for the initial pose estimation and a z-axis orientation for the current pose estimation.

5. The method of claim 4, further comprising determining whether the error is within an acceptable margin of error by one or more of:

determining whether the x-axis coordinate error is within an x-axis coordinate acceptable margin of error;

determining whether the x-axis orientation error is within an x-axis orientation acceptable margin of error;

determining whether the y-axis coordinate error is within a y-axis coordinate acceptable margin of error;

determining whether the y-axis orientation error is within a y-axis orientation acceptable margin of error;

determining whether the z-axis coordinate error is within a z-axis coordinate acceptable margin of error; or determining whether the z-axis orientation error is within a z-axis orientation acceptable margin of error;

wherein the error is within the acceptable margin of error only when each of the x-axis coordinate error, the x-axis orientation error, the y-axis coordinate error, the y-axis orientation error, the z-axis coordinate error, and the z-axis orientation error is within its respective acceptable margin of error.

6. The method of claim 5, wherein the x-axis coordinate acceptable margin of error and the y-axis coordinate acceptable margin of error are smaller than the z-axis coordinate acceptable margin of error.

7. The method of claim 1, wherein calculating the initial pose estimation and calculating the current pose estimation further comprises applying a visual inertial odometry algorithm to successive images captured by the camera.

8. The method of claim 1, further comprising:

calculating an error between the current pose estimation for the camera and the initial pose estimation for the camera;

determining whether the error is within an acceptable margin of error; and in response to determining the error is within an acceptable margin of error, causing the camera to automatically capture a new image with the camera.

9. The method of claim 1, wherein augmenting the current camera display comprises generating augmented reality markers and overlaying the augmented reality markers on the depiction of the real-time reading of the image sensor of the camera, and wherein one or more of the guidance image markers or the live image markers comprise a depiction of a three-dimensional object.

10. The method of claim 1, further comprising:

calculating an error between the current pose estimation for the camera and the initial pose estimation for the camera;

determining whether the error is within an acceptable margin of error; and in response to determining the error is within the acceptable margin of error, augmenting the current camera display with alignment markers indicating the live image markers are aligned with the guidance image markers within a threshold margin.

11. Non-transitory computer readable storage media storing instructions for execution by one or more processors, the instructions comprising:

determining a guidance image captured by a camera and a guidance parameter measured by an inertial measurement unit associated with the camera;

calculating an initial pose estimation for the camera based on the guidance parameter;

calculating a current pose estimation for the camera based on a real-time parameter measured by the inertial measurement unit associated with the camera;

providing a current camera display comprising a depiction of a real-time reading of an image sensor of the camera;

augmenting the current camera display with guidance image markers indicating the initial pose estimation for the camera; and augmenting the current camera display with live image markers indicating the current pose estimation for the camera.

12. The non-transitory computer readable storage media of claim 11, wherein the instructions are such that calculating the initial pose estimation and calculating the current pose estimation comprise calculating based on a position of the camera in world coordinates and an orientation of the camera in world coordinates.

13. The non-transitory computer readable storage media of claim 11, wherein the instructions further comprise calculating an error between the current pose estimation and the initial pose estimation by one or more of:

calculating a difference in orientation of the camera; and calculating a difference in x-axis, y-axis, and z-axis coordinates for the camera.

14. The non-transitory computer readable storage media of claim 13, wherein the instructions are such that calculating the error between the current pose estimation and the initial pose estimation further comprises one or more of:

calculating an x-axis coordinate error indicating a difference between an x-axis coordinate for the initial pose estimation and an x-axis coordinate for the current pose estimation;

calculating an x-axis orientation error indicating a difference between an x-axis orientation for the initial pose estimation and an x-axis orientation for the current pose estimation;

calculating a y-axis coordinate error indicating a difference between a y-axis coordinate for the initial pose estimation and a y-axis coordinate for the current pose estimation;

calculating a y-axis orientation error indicating a difference between a y-axis orientation for the initial pose estimation and a y-axis orientation for the current pose estimation;

calculating a z-axis coordinate error indicating a difference between a z-axis coordinate for the initial pose estimation and a z-axis coordinate for the current pose estimation; and calculating a z-axis orientation error indicating a difference between a z-axis orientation for the initial pose estimation and a z-axis orientation for the current pose estimation.

15. The non-transitory computer readable storage media of claim 14, wherein the instructions further comprise determining whether the error is within an acceptable margin of error by one or more of:
- determining whether the x-axis coordinate error is within an x-axis coordinate acceptable margin of error;
- determining whether the x-axis orientation error is within an x-axis orientation acceptable margin of error;
- determining whether the y-axis coordinate error is within a y-axis coordinate acceptable margin of error;
- determining whether the y-axis orientation error is within a y-axis orientation acceptable margin of error;
- determining whether the z-axis coordinate error is within a z-axis coordinate acceptable margin of error; or
- determining whether the z-axis orientation error is within a z-axis orientation acceptable margin of error;
- wherein the error is within the acceptable margin of error only when each of the x-axis coordinate error, the x-axis orientation error, the y-axis coordinate error, the y-axis orientation error, and the z-axis coordinate error, and the z-axis orientation error is within its respective acceptable margin of error.

16. A system comprising one or more processors programmable to execute instructions stored in non-transitory computer readable storage media, the instructions comprising:
- determining a guidance image captured by a camera and a guidance parameter measured by an inertial measurement unit associated with the camera;
- calculating an initial pose estimation for the camera based on the guidance parameter;
- calculating a current pose estimation for the camera based on a real-time parameter measured by the inertial measurement unit associated with the camera;
- providing a current camera display comprising a depiction of a real-time reading of an image sensor of the camera;
- augmenting the current camera display with guidance image markers indicating the initial pose estimation for the camera; and
- augmenting the current camera display with live image markers indicating the current pose estimation for the camera.

17. The system of claim 16, wherein each of the initial pose estimation for the camera and the current pose estimation for the camera is based on a position of the camera in world coordinates and an orientation of the camera in world coordinates.

18. The system of claim 16, wherein the instructions further comprise:
- calculating an error between the current pose estimation for the camera and the initial pose estimation for the camera;
- determining whether the error is within an acceptable margin of error; and
- in response to determining the error is within the acceptable margin of error, causing the camera to automatically capture a new image with the camera.

19. The system of claim 16, wherein the instructions are such that augmenting the current camera display comprises generating augmented reality markers and overlaying the augmented reality markers on the depiction of the real-time reading of the image sensor of the camera, and
- wherein one or more of the guidance image markers or the live image markers comprise a depiction of a three-dimensional object.

20. The system of claim 19, wherein the instructions further comprise:
- calculating an error between the current pose estimation for the camera and the initial pose estimation for the camera;
- determining whether the error is within an acceptable margin of error; and
- in response to determining the error is within the acceptable margin of error, augmenting the current camera display with indicating the live image markers are aligned with the guidance image markers within a threshold margin.

* * * * *